UNITED STATES PATENT OFFICE.

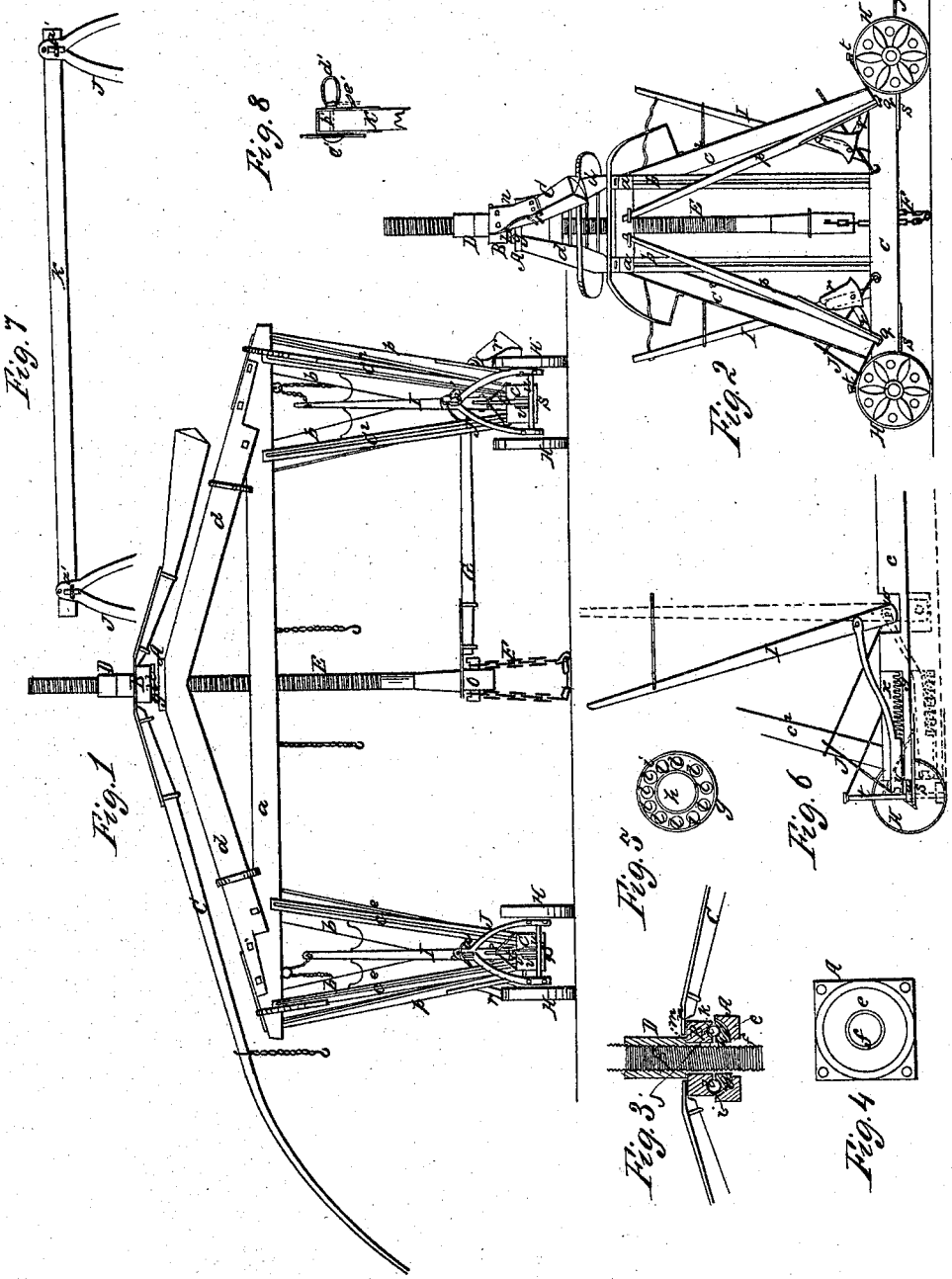

EDWARD VAUGHN, OF ALLIANCE, OHIO.

STUMP-MACHINE.

Specification of Letters Patent No. 12,525, dated March 13, 1855.

*To all whom it may concern:*

Be it known that I, EDWARD VAUGHN, of Alliance, in the county of Stark and State of Ohio, have invented a new and useful Machine for Extracting Stumps of Trees out of the earth; and I do hereby declare that the following is a full, clear, and exact description of the construction and operation of the same, reference being had to the annexed drawing, making a part of this specification.

The following rule to be observed (*i. e.*) corresponding tellers, refer to corresponding parts.

The arch beams ($d\ d$) are joined together at the top or over the center of the frame, and at the lower ends, are secured to the horizontal beams ($a$) forming a double arch. The horizontal beams ($a$) are supported by brace posts ($b\ b$) and secured by incline braces ($c^2\ c^2$). The brace posts ($b\ b$) resting on sills ($c$) in V form, the above mentioned frame is firmly secured by rods and bolts.

(D) is a nut through which the screw (E) passes, said nut passing through a square mortice in the sweep (C) and rests in a square recess ($m$) in hub (B).

(B) is a cylindrical hub secured to plate ($n$) or sweep (C) by bolts, and has an inverted groove ($k$) in its lower end, which rests on friction balls ($l$).

($g$) is a half spherical washer, with a groove ($i$) in its top or flat side, in which friction balls ($l$) play.

(A) is a concave plate secured to the arch beams ($d\ d$) at their center or top, by bolts, see Figures 1 and 4.

($e$) is a concave in plate A, Fig. 4, in which the half spherical washer ($g$) plays, permitting frictions balls ($l\ l$) to play in grooves ($i$) and ($k$).

(E) is a screw passing through openings ($f\ h$ and $j$) in Figs. 1, 3, 4, and 5, into nut (D) thereby forming a combination for destroying friction, and permitting screw (E) and nut (D) to ositate, and conform to the line of pressure.

(G) is a lever passing over the square ($o$) on the screw (E) to prevent the chain (F) from twisting while in the act of extracting a stump (see Fig. 1).

($p\ p$) are levers. ($r\ r$) blocks or fulcrums. ($g\ g$) hinges for elevating the frame of machine and attaching the trucks (H H) to sills (C), the dog ($v$) is thrown back by a cord at top of lever (I) permitting the axle ($u$) to pass down the path ($t$) and rest on the plates ($s\ s$). The spherical spring ($z$) in the recess ($x$) in sill (C), throws the dog ($v$) over the axle ($u$) and the machine is loaded (see Figs. 1, 2, and 6).

The trucks (H H) are secured to the sills (C) by the posts ($t$) passing through a hole in the center of the axle ($u$), see Figs. 1 and 6.

Posts ($t$) are secured to sills (C), by the plates ($s$) and crochet braces (see Figs. 1, 2, and 6).

(K) Fig. 7 is a bar screwed to hounds (J J) by bolts passing through slots ($a^t$) in hounds (J J), said bolts ($t^t$) having lugs ($c^t$) at one end and rings ($d^t$) at the other end, and are fastened by turning said rings at right angle and thrown over pins ($c^t$).

The forward trucks are kept in their relative position while moving, by the bar (K), see Figs. 2, 7, and 8.

The hounds of the hind trucks are thrown back on sills (C) and secured by a clasp (see Figs. 1, 2, and 6).

N. B. To set the machine for use, the trucks (H H) are detached from the sills (E) by throwing the dog ($v$) back with the lever (I) the frame is dropped to the ground, and rests on sills (see Figs. 1, 2, and 6).

What I claim as my invention, and desire to secure by Letters Patent of the United States, is.

1. The arch beams ($d\ d$), the brace posts ($l\ l$) in combination with the incline braces ($c^2\ c^2$), and horizontal beams ($a$), making a new and useful, firm and compact frame as set forth in the body of the specifications.

2. Also the combination of a half spherical and groove ($i$) forming a new half spherical washer ($g$).

3. Also the combination of the groove ($k$) opening ($j$) with a square recess ($m$) for the purpose as set forth.

4. Also for the purpose of attaching and detaching the trucks (H H) to and from sills (E) by the combination of levers ($h\ h$), fulcrums ($r\ r$), joints ($g\ g$), posts ($t\ t$), dogs ($v$) and levers (I) as set forth in specifications.

5. Also the securing of the bar (K) to the hounds (J J) as set forth in specifications.

N. B. I do not claim any one separate thing in the above mentioned invention, but do claim the combination is set forth in specifications.

EDWARD VAUGHN.

Witnesses:
  EXUM VIAKE,
  JOHN ELLISON.